(12) United States Patent
Hartzsch

(10) Patent No.: US 7,590,140 B2
(45) Date of Patent: Sep. 15, 2009

(54) METHOD FOR ADDRESSING THE PARTICIPANTS OF A BUS SYSTEM

(75) Inventor: Joerg Hartzsch, Dortmund (DE)

(73) Assignee: ELMOS Semiconductor AG, Dortmund (DE)

( * ) Notice: Subject to any disclaimer, the term of this patent is extended or adjusted under 35 U.S.C. 154(b) by 1004 days.

(21) Appl. No.: 10/862,417

(22) Filed: Jun. 8, 2004

(65) Prior Publication Data

US 2005/0271077 A1 Dec. 8, 2005

(51) Int. Cl.
- H04L 12/42 (2006.01)
- G06F 13/00 (2006.01)
- G06F 13/14 (2006.01)

(52) U.S. Cl. .................. 370/451; 710/305; 710/107

(58) Field of Classification Search .............. 370/451, 370/462, 463; 710/305, 107; 709/209
See application file for complete search history.

(56) References Cited

U.S. PATENT DOCUMENTS

| | | | |
|---|---|---|---|
| 5,583,754 A * | 12/1996 | Leonhardt et al. | 700/3 |
| 5,914,957 A * | 6/1999 | Dean et al. | 370/438 |
| 6,397,280 B1 * | 5/2002 | Nitschke et al. | 710/110 |
| 2004/0109270 A1 * | 6/2004 | Stockinger et al. | 361/56 |
| 2004/0174147 A1 * | 9/2004 | Vinciarelli | 323/266 |
| 2005/0271077 A1 * | 12/2005 | Hartzsch | 370/451 |

FOREIGN PATENT DOCUMENTS

| | | |
|---|---|---|
| DE | 4038992 C1 | 2/1992 |
| DE | 4404962 A1 | 8/1995 |
| DE | 4428502 A1 | 2/1996 |
| DE | 19647668 A1 | 5/1998 |
| DE | 19756564 A1 | 6/1998 |
| DE | 10147512 A1 | 4/2003 |
| EP | 0489346 B1 | 6/1992 |
| EP | 0854609 A2 | 7/1998 |
| WO | WO 97/45983 A1 | 12/1997 |

* cited by examiner

*Primary Examiner*—Seema S Rao
*Assistant Examiner*—Jianye Wu
(74) *Attorney, Agent, or Firm*—Birch, Stewart, Kolasch & Birch, LLP

(57) ABSTRACT

In the method for addressing the participants of a bus system, the central control unit connects the bus line to one potential of the operating voltage, while each participant tries to pull the bus line to a reference potential, normally the operating voltage, wherein, due to the current source behavior of the switch placing the bus to the operating voltage, a current is detectable by a detector arranged in the bus line and associated with the participant. When the participant detects this decrease of current, said participant switches off its switch. Due to time-defined slow connection of the switched current sources, this process takes place sequentially within a group of participants until the last participant is reached. The detector associated with this participant does in no case detect a current, such that, after elapse of a predeterminable on-period, the switch of this participant is still open. Thus one of the participants from the group of all participants is specified such that an address can now be allocated to this participant. During further addressing cycles the remaining participants are subjected to the same process, wherein the switch of the participant already addressed remains open all the time.

22 Claims, 8 Drawing Sheets

Fig.3 Employment of the structures according to the invention for bus communication Fig. 4 Employment of the structures according to the invention for bus communication

METHOD FOR ADDRESSING THE PARTICIPANTS OF A BUS SYSTEM

BACKGROUND OF THE INVENTION

1. Field of the Invention

The present invention relates to the addressing of (any number of) participants of a bus system having a control unit, a bus starting from the control unit, and a plurality of participants that are sequentially connected to the bus.

2. Description of the Background Art

For minimizing wiring complexities, for example in vehicles, it is more and more common practice to transmit control signals for driving actuating elements via a bus to which, besides a control unit, the drive units for the actuator devices of the individual participants are connected. Combined to form a bus system are, for example, actuator devices of a vehicle air conditioner, a window lift, or front seats of a vehicle. To enable the control unit to selectively drive one or a plurality of actuators, addresses are assigned to the actuators. Conventionally, the addresses have been stored in the participants by programming or have been assigned to the participants via a plug or PIN coding. While programming is relatively unproblematic during manufacturing of a vehicle, it is more complicated when the overall participant, i.e. the actuator device plus the drive unit, is, for example, replaced in a repair shop. Further, with regard to the logistics, it is necessary that defined placement sequences are adhered to, which involves service inconvenience and a supply of pre-programmed (pre-addressed) components, which runs counter to the identical-part principle. Further, the plug coding may lead to a malfunction. Finally, it is also possible to realize the self-addressing of the participants of a bus system via switches for serially separating the bus connections between the participants. The drawbacks encountered in this regard are in particular the electrical disconnection of the bus line via active components and the large space requirement for bus systems that have numerous participants.

Automated address allocation methods for bus systems are known from EP 0 854 609 A1, DE 196 47 668 A1, DE 44 04 962 C2, DE 44 28 502 A1, WO 97/45983 A1 and DE 197 56 564 A1, for example.

From DE 40 38 992 C2 a method is known where the addresses of components of a danger-warning system are automatically assigned. Addressing is effected from the participant that is arranged the closest to the central unit to the participant that is arranged the furthest away from the central unit. Each participant includes a resistor in each of the two wires of a warning-system primary line, and a plurality of electrical and electronic components between the two wires. Further, each participant is provided with a short-circuit switch for short-circuiting the two wires. When a switch is short-circuited, the voltage drop across the two aforementioned resistors (with a measuring current being impressed onto the warning-system primary line) and can be measured. All participants are arranged in series in the warning-system primary line.

At the beginning of the addressing process a central control unit transmits a short-circuit signal for closing the short-circuit switches of all participants, which have not been addressed so far. Then a measuring current is impressed that is designed to cause a voltage drop in the first participant, as seen from the central unit, (i.e. a participant arranged closest to the central unit) of the group of participants not addressed so far. Thereafter, an address data signal is applied to the warning-system primary line. That participant, to which no address has been assigned and which previously detected a voltage drop, takes this address data signal into its address memory. Subsequently the short-circuit signal is allocated for the purpose of further addressing, wherein the short-circuit switch of the participant addressed before is not closed, but rather the short-circuit switches of all participants not addressed so far are activated. When the measuring current is being impressed, it generates a voltage drop, which is to be detected, in that participant of the group of participants not addressed so far that is now arranged closest to the control unit, such that this participant, in the next phase in which an address data signal is applied to the warning-system primary line, stores this address in its address memory and is thus also addressed. This process is continued until the last participant is addressed.

This known method proceeds from the ideal assumption that due to short-circuiting of the two wires of the warning-system primary line the overall measuring current flows via the short-circuit switch of that participant of the group of participants not addressed that is arranged closest to the central control unit. In the practice, electronic switches, which are used as short-circuit switches in the known method, have an on-resistance which is not negligible. Therefore a portion of the measuring current flows through the short-circuit switch of the adjacent participant not addressed so far and generates a voltage drop across this participant's resistors. It is thus necessary not only to take into account the fact that a voltage drop has been detected but also to detect the magnitude of this voltage drop. Further, it must be taken into consideration that, the farther away a participant not addressed so far is arranged from the central control unit, the more the measuring current and thus the detectable voltage drop are reduced. The reason for this is the fact that the measuring current must flow via the closed short-circuit switch of a participant located relatively far away from the central control unit via the resistors arranged in the wires of the warning-system primary line of the participant already addressed and disposed before the former participant. Evaluation and reliable detection of the voltage drops according to the known method are thus not trivial and involve high circuit complexities and programming effort.

In the German Patent Application DE 101 47 512 A1 a method is proposed which eliminates the problems described with regard to DE 40 38 992 C2. However in a specific embodiment the problem of relatively high BUS flows is encountered. These flows occur when the resistance of a pull-up 30 or a pull-down 40 of a central control unit 14 is lower than a joint resistance of all switches 26 of all participants 1 to 9. Although not shown in detail in FIGS. 1 to 13, DE 40 38 992 C2 describes this switch 26 as a switchable resistor. This fact forms the basis for the known principle.

In practice, the pull-up and/or the pull-down of the central control unit will display a current limitation which is due to current source behavior or resistance.

In the Figs. of DE 40 38 992 C2 the pull-up and/or the pull-down are illustrated as a resistor. Thus it is necessary that the individual current of each participant is dimensioned at a smaller value than the value of the current limitation of the central control unit divided by the number of participants. First, the measuring current available for generating a useful signal is thus so small that despite the high measuring effort only faulty measurements may be expected. Second, this maximum usable measuring current depends on the number of bus participants.

SUMMARY OF THE INVENTION

It is therefore an object of the present invention to provide for a method and apparatus for addressing the participants of a bus system.

In a preferred embodiment for addressing the participants of a bus system, the central control unit connects the bus line to one potential of the operating voltage, while each participant tries to pull the bus line to a reference potential, normally the operating voltage, wherein, due to the current source behavior of the switch placing the bus to the operating voltage, a current is detectable by a detector arranged in the bus line and associated with the participant. When the participant detects the decrease of current, the participant switches off its switch. Due to time-defined slow connection of the switched current sources, this process takes place sequentially within a group of participants until the last participant is reached. The detector associated with this participant does in no case detect a current, such that, after elapse of a predeterminable on-period, the switch of this participant is still open. The "open switch" state results from the first response of the detector, and this is the reason why in the above and the following description "open switch" means that the detector has responded. Thus one of the participants from the group of all participants is specified such that an address can now be allocated to this participant. During further addressing cycles the remaining participants are subjected to the same process, wherein the switch of the participant already addressed remains open all the time.

In particular, the method according to the invention offers the advantage that the static sum current of the controllable switches of all participants may be dimensioned to a higher value than the current which can be supplied by be resistor and/or the current source of the central control unit. In other words, the current flowing through a controllable switch may be larger that the current flowing off via the central control unit divided by the number of participants. Thus the following applies:

$$I(27) > I(30)/n,$$

wherein I(27) is the current flowing through the controllable switch, I(30) is the current flowing through the resistor or the current source, and n is the number of participants (see attached Figs.).

Thus the useful signal to be employed for addressing purposes, i.e. the currents to be sensed by the detectors, is increased. As a result, the detectors are more inexpensive to produce since they need not be too sensitive. Further, the disturbance sensitivity in the addressing method according to the invention is improved.

Due to the fact that, according to the invention, the resistor used in the method is defined by a switch which is required for bus communication and which is controllable, realization of the inventive method does not require any additional component in comparison to a standard bus, which reduces the expenditure with regard to implementation of the method in an existing bus system.

In the variant according to claim 8 of the invention, the shunt resistors of the detectors used for current detection may have a relatively high resistance since they are not located in the bus line, and the useful signal for the detector is thus essentially increased, whereby the current influences may be reduced and therefore the detectors are considerably more inexpensive to produce.

If an analog-digital converter is arranged behind the shunt resistor and a digital comparator is used as a comparator, the threshold value can be parameterized in dependence on the application and the operating conditions, such as supply voltage, temperature and number of participants.

The method according to the invention need not be applied to all participants of the bus system. Further, the participants, to which the method is applied, may be located at any place/places of the bus system. In other words, the bus system may comprise participants at any place/places, which do not partake in the addressing process according to the invention, but do not disturb the process. These participants may then be addressed in a manner different from the inventive manner.

According to an advantageous variant of the invention, the modules of the central control unit are optionally provided as individual modules or in a combined form and/or as double modules, i.e. one module per bus connection, whereby both ends of the bus line are adapted to be operated by the central unit for analysis purposes and in the case of a fault (for example, open plug contact).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
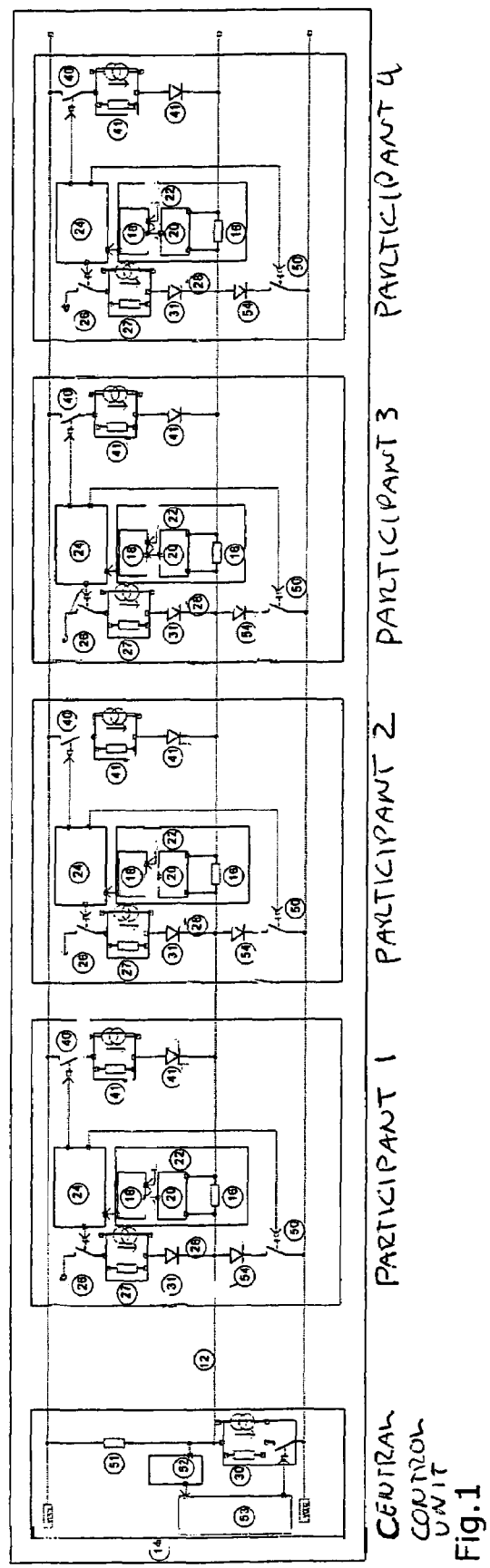
FIG. 1 shows a setup of a bus system for address allocation comprising four participants and having various optional additional modules, wherein the comparators required for bus communication are not shown since they are not involved in the address allocation process.
Figure 2:
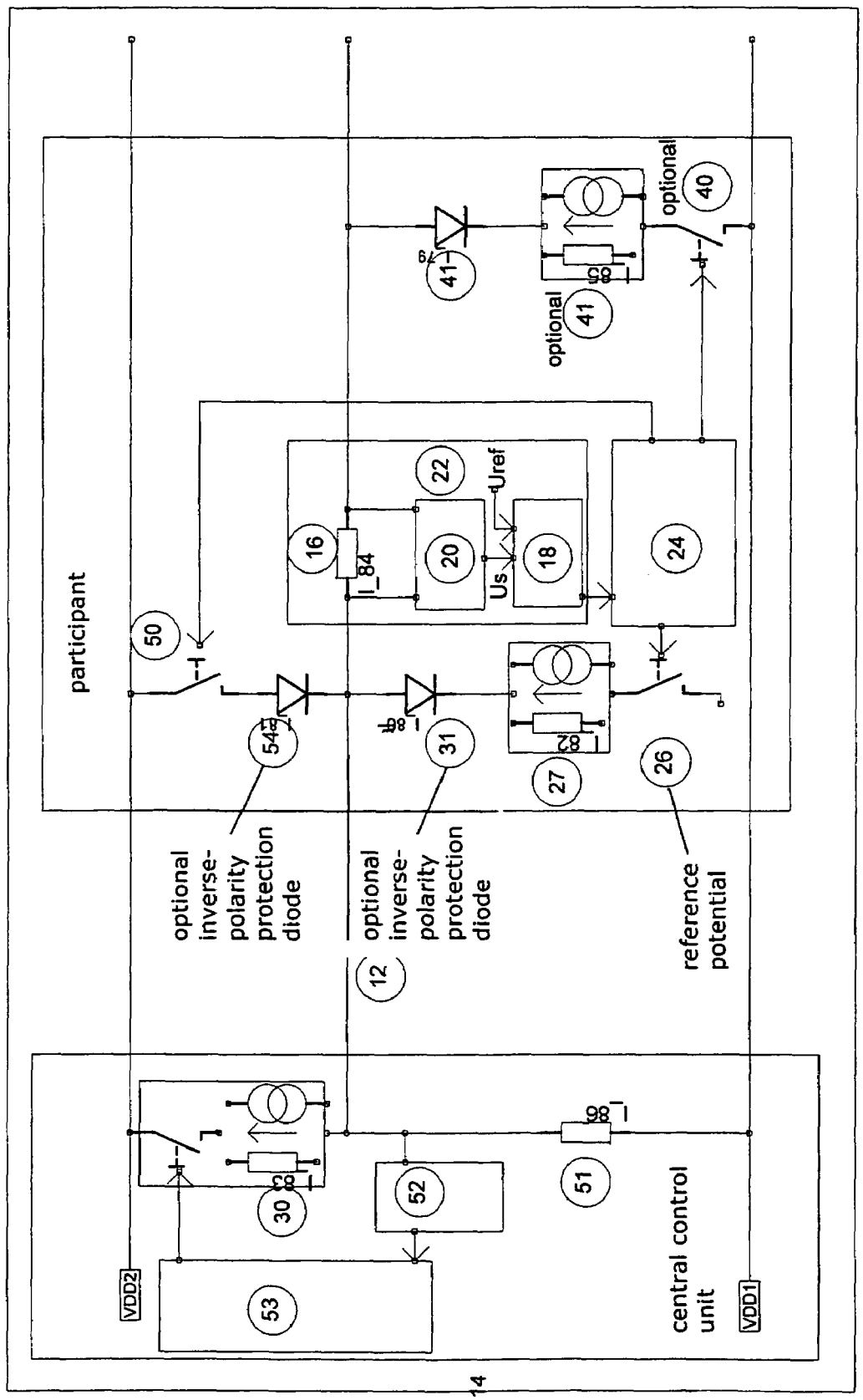
FIG. 2 shows a setup of the same system as shown in FIG. 1, but with inverse polarity of VDD1 and VDD2 to illustrate the fact that the polarity of VDD1 and VDD2 is not crucial, wherein both variants are mutually derivable by mirroring at the x-axis, and wherein only one participant is shown.
Figure 3:
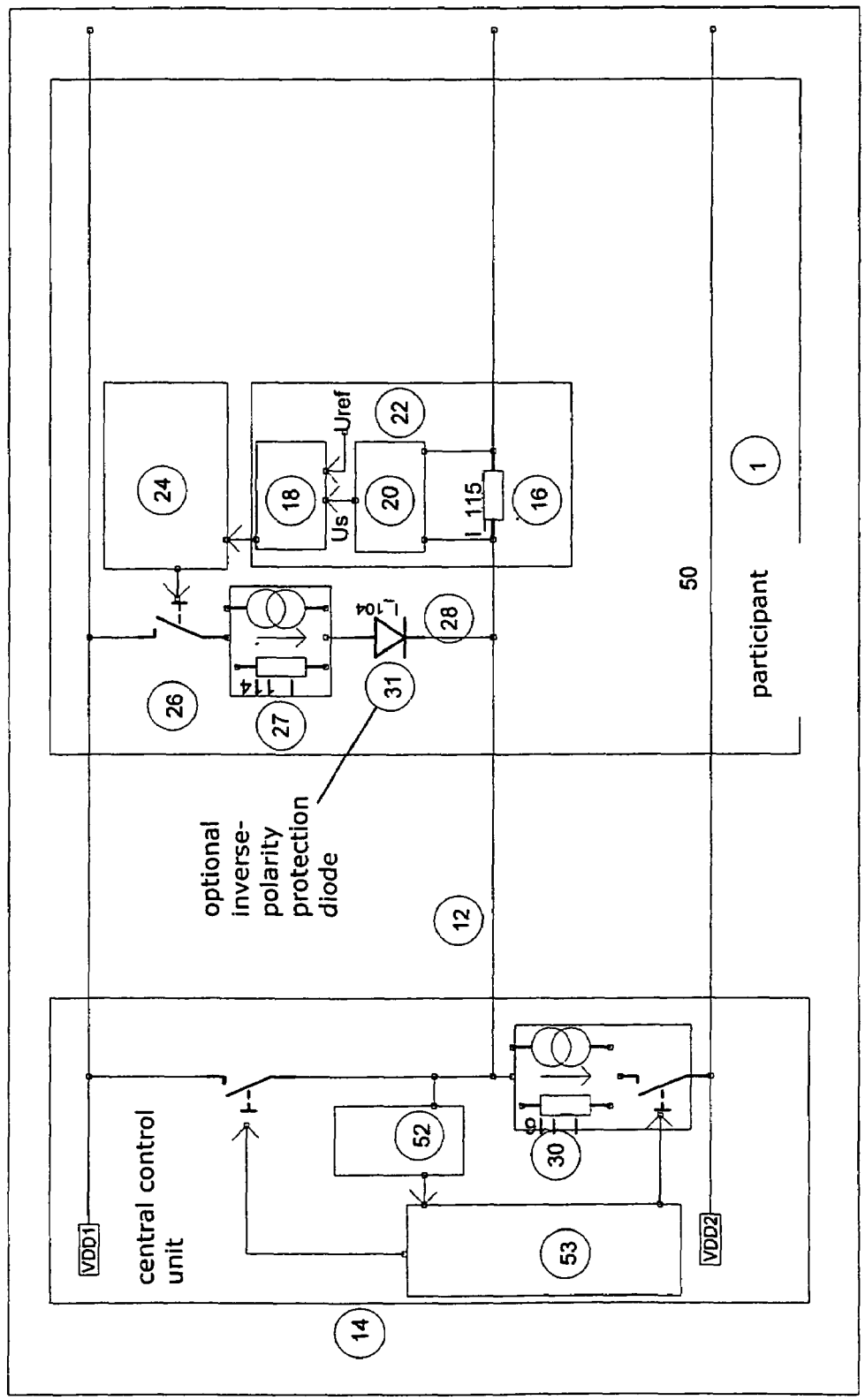
FIG. 3 shows a setup of a bus system for address allocation using the same structures for communication and address allocation, wherein only one participant is shown.
Figure 4:
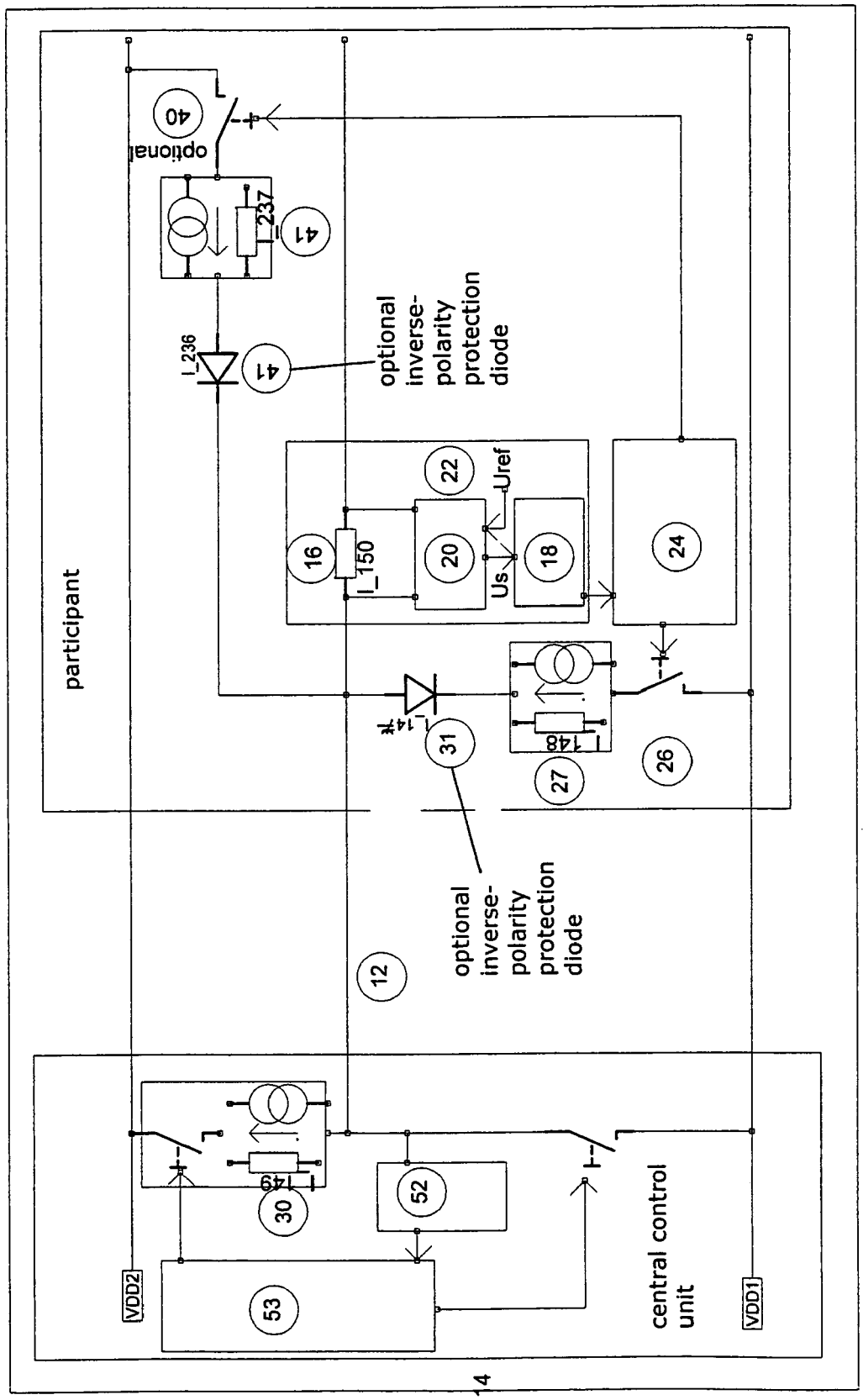
FIG. 4 shows a setup of the same system as shown in FIG. 3 but with inverse polarity.
Figure 5:
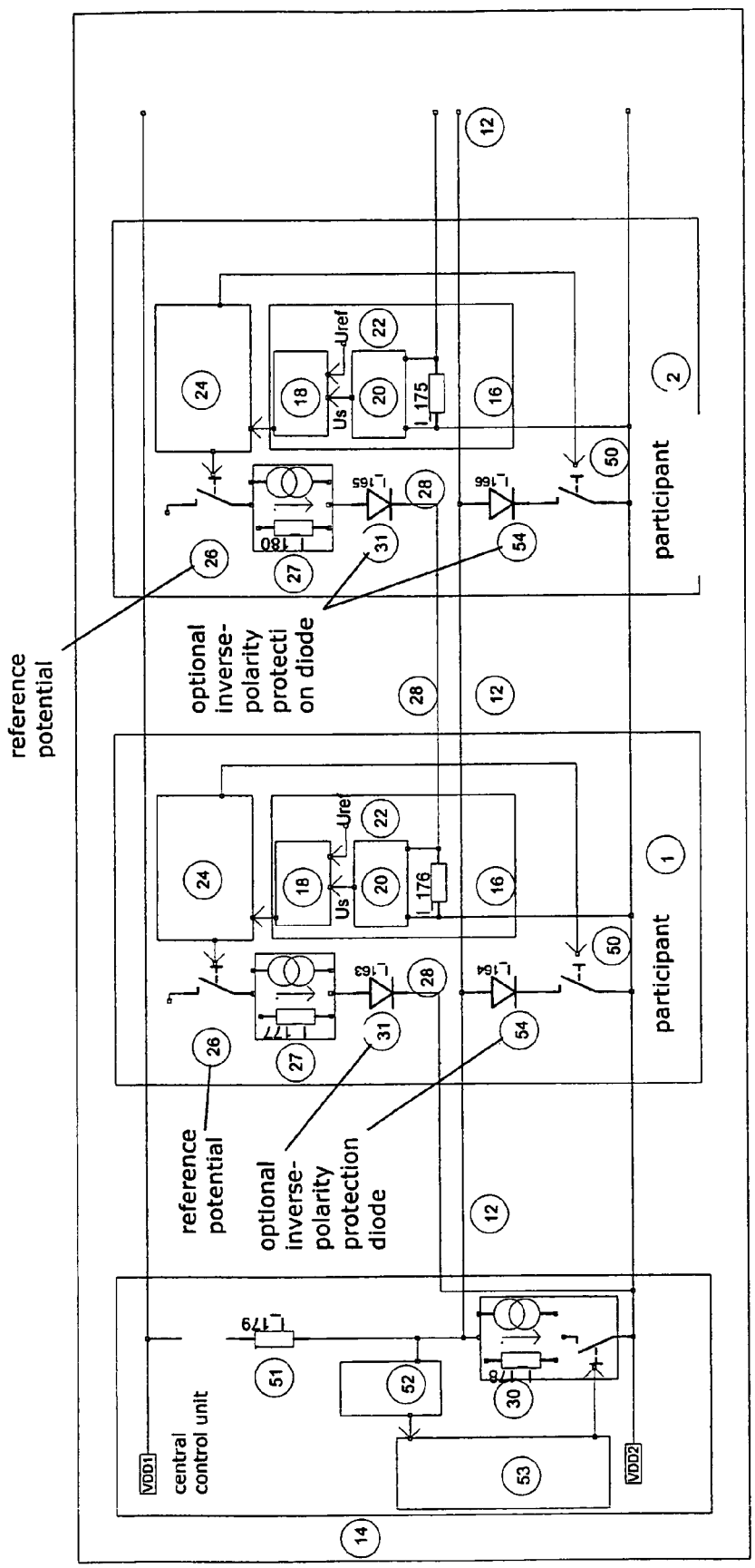
FIG. 5 shows a setup of a bus system for address allocation with parallel arrangement of the current detectors and employment of an additional line, wherein two participants are shown.
Figure 6:
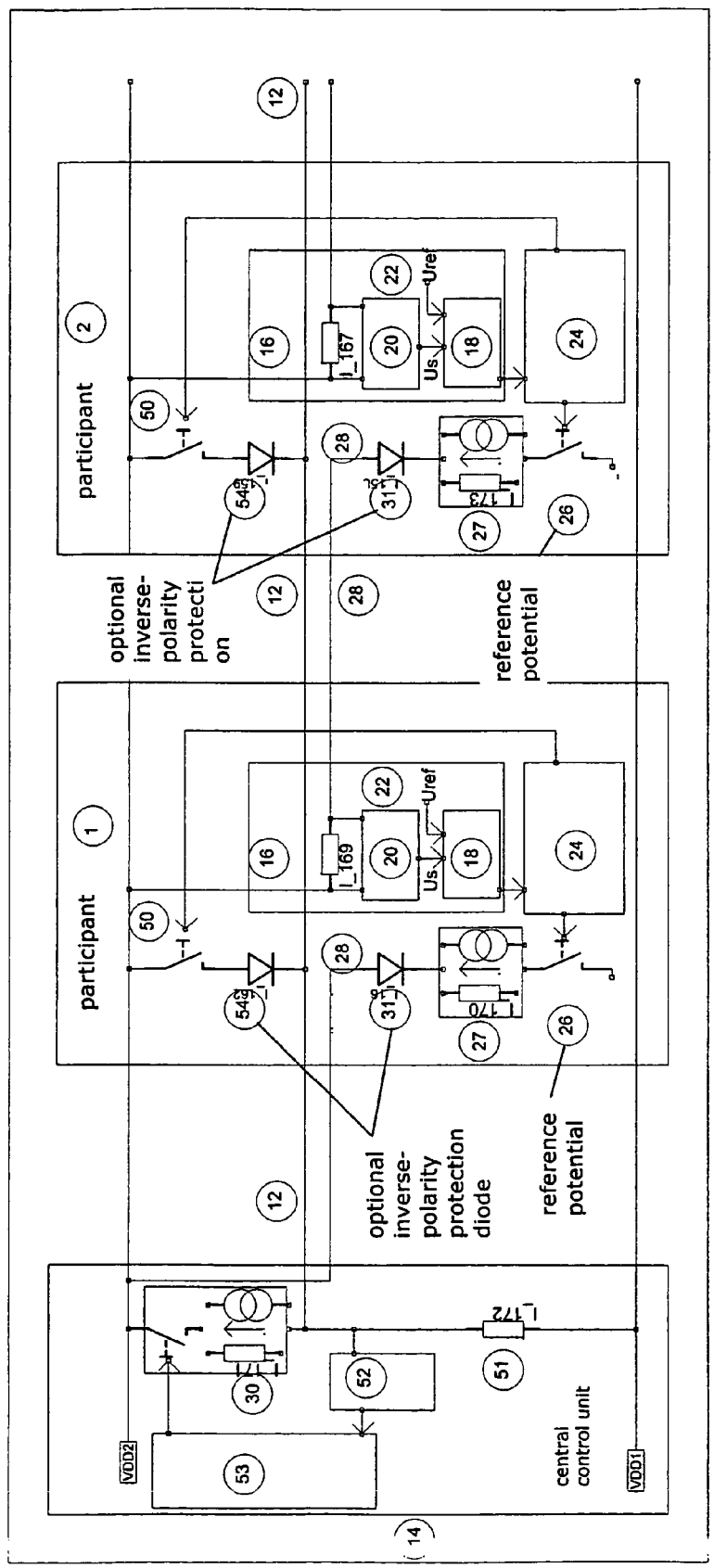
FIG. 6 shows a bus system as that shown in FIG. 5 but with inverse polarity.
Figure 7:
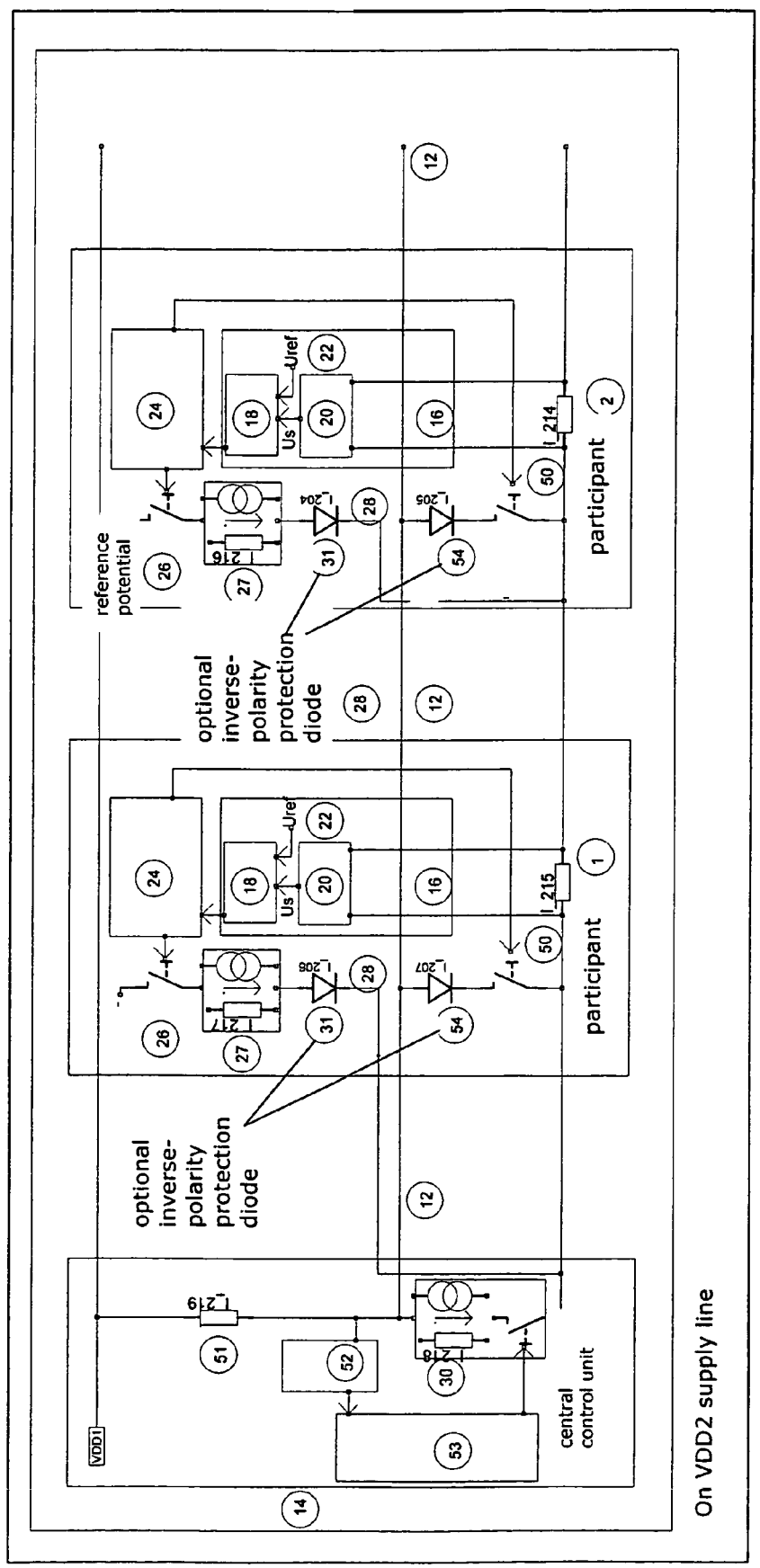
FIG. 7 shows a setup of a bus system for address allocation using a supply line for current detection.
Figure 8:
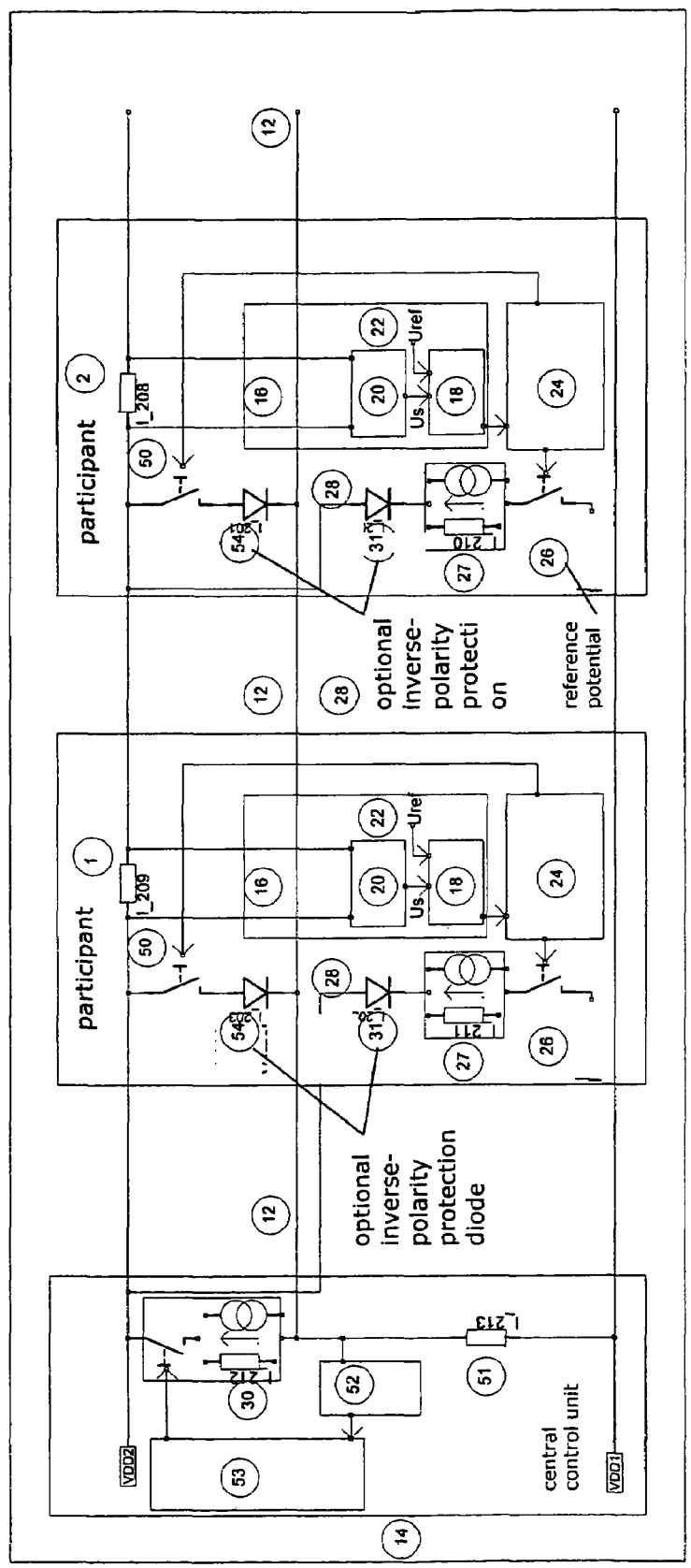
FIG. 8 shows a setup of the same system as shown in FIG. 7 but with inverse polarity.

Generally, in the bus systems shown in FIGS. 1 to 8, a central control unit 14 connects the bus line 12, when the participants 1 to 4 are addressed in the inventive manner, to one potential of the operating voltage VDD2, while each participant 1 to 4 tries to pull the bus line 12 to a reference potential, normally the operating voltage VDD1, wherein, due to the current source behavior 27 of the switch 26 placing the bus to the operating voltage, a current is detectable by a detector 22, which is arranged in the bus line 12 and is associated with the participant 1 to 4. When the participant detects this decrease of current with the aid of its drive unit 24, the participant switches off its switch 26. Due to time-defined slow connection of the switched current sources, this process takes place sequentially within a group of participants 1 to 4 until the last participant is reached. The detector 22 associated with this participant 4 does in no case detect a current, such that, after elapse of a predeterminable on-period, the switch 26 of this participant 1 to 4 is still open. Thus one of the participants from the group of all participants 1 to 4 is specified such that an address can now be allocated to this participant. During further addressing cycles the remaining participants are subjected to the same process, wherein the switch of the participant 4 already addressed remains open all the time.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

REFERENCE NUMERALS

14 Central control unit comprising
  51 Pull-up resistor
  52 Comparator for BUS operation
  53 Drive of the physical BUS interface
  30 Driver for BUS operation: switch with resistive or current source behaviour
1 to 4 Participant comprising
  50 Switch required for bus communication
  22 Current detectors comprising
    16 Shunt resistor
    18 Comparator
    20 Preamplifier
    24 Control unit
  26 Switch of each participant for impressing a measuring current
  27 Resistance or current source behaviour of switch 26
  28 Connecting line branching off the bus line 12
40,41 Switchable BUS pull-ups (optional additional modules)
31,41,54 Inverse-polarity protection diodes (optional additional modules)

The invention claimed is:

1. A method for addressing of participants of a bus system including a bus line, a central control unit including a central control switch having one end connected to a reference potential and another end connected to the bus line and for connecting the central control unit to the reference potential, and a plurality of participants connected with the bus line, each corresponding participant including a detector for detecting a current flow between a corresponding participant and a participant located closest to the corresponding participant and farther away from the central control unit, a controllable switch for establishing a connection of the bus line with a reference potential, a drive unit for switching on and off the controllable switch based an output signal of the detector, a bus connection switch for connecting the corresponding participant to the bus line, an address memory, wherein in the method comprises:

in a first phase, the central control unit applies to the bus line a closing signal for time-limited closing of the controllable switches for a predeterminable on-period;

in a second phase, the detector of each corresponding participant determines whether a current flows or does not flow between participants adjacent to the corresponding participant, and with an exception of a last participant arranged farthest away from the central control unit, the detector of each corresponding participant detects a current flow to a respective participant arranged farther away from the central control unit and closest to the respective participant, the controllable switches of all corresponding participants are opened, and the detector of the last participant arranged farthest away from the central control unit, does, during the on-period, not detect a current flow to a participant arranged farther away from the central control unit and closest to the last participant, and the controllable switch of the last participant is still closed upon elapse of the on-period and is open only after elapse of the on-period; and in a third phase, the central control unit applies an address data signal to the bus line, wherein said address data signal is stored in the address memory of the corresponding participant whose switch has changed into the open state since the on-period has elapsed such that the corresponding participants are addressed, wherein the controllable switches of all participants are activated simultaneously, which leads to a relatively slow rise of currents in the controllable switches, as a result of which a sum current on the bus line rises relatively slowly, wherein the controllable switches of all participants are deactivated directly or with a time delay based on a response of the detector of the corresponding participant, as a result of which a sum current of all participants is reduced because of a load of the corresponding participant, said deactivating step taking place as a chain reaction starting with a first participant located closest to the central control unit, wherein the sum current on the bus line rises slowly due to slow energizing of the controllable switches relative to a low speed of response of the detectors, and, at a same time, is stepwise reduced due to the step of deactivating the controllable switches, as a result of which the sum current remains limited, wherein a current-carrying capacity of the central control switch of the central control unit is always larger than a sum of the instantaneous currents of the controllable switches of all participants, as a result of which the controllable switches of all participants remain in a position to impress the currents on the bus system, and wherein the first, second and third phases are applied to switches of all participants of a group of participants that have not been previously addressed.

2. The method of claim 1, wherein the central control unit comprises:

a central control switch having one end connected to the reference potential and another end connected to the bus line and for connecting the central control unit to the reference potential; and a pull-up resistor connected having one end connected to the reference potential and another end connected to the bus line;

a comparator having one end connected between the central control switch and the pull-up resistor; and a driver connected to the comparator and the central control switch and the comparator and for controlling the central control switch based on a result of the comparator.

3. The method of claim 1, wherein the controllable switch of each participant has a defined resistance or current source behaviour that is approximately identical for all participants.

4. The method of claim 1, wherein the corresponding participants are addressed in a plurality of addressing cycles.

5. The method of claim 4, wherein the on-period is reduced from address cycle to address cycle.

6. The method of claim 1, wherein the central control unit includes a plurality of central control units, and wherein at least one of the plurality of central control units initiates closing of the controllable switches of all participants of the group of participants not addressed.

7. The method of claim 1, wherein the drive units of all participants, close the controllable switches of all participants within a predeterminable period and then open the controllable switches for the purpose of synchronizing a closing process of the controllable switches for the duration of the on-period, wherein opening of a last controllable switch is recognized as a point of time for a synchronization time, and wherein, after elapse of another period, all controllable switches are closed in a synchronized manner for the duration of the on-period.

8. The method of claim 1, wherein the detectors are connected in series in the bus line, and that the controllable switch of each corresponding participant is arranged in a connecting line which branches off the bus line before the detector of the corresponding participant as seen from the central control unit.

9. The method of claim 1, wherein the last participant arranged farthest away from the central control unit does not include a detector.

10. The method of claim 1, wherein each detector includes a shunt resistor and a comparator for comparing a voltage drop across the shunt resistor with a reference value.

11. The method of claim 10, wherein each detector further includes a preamplifier for amplifying the voltage drop arranged before the comparator.

12. The method of claim 10, wherein each detector further includes an analog-digital converter arranged behind the shunt resistor.

13. The method of claim 10, wherein the comparator is a digital comparator.

14. The method of claim 10, wherein the shunt resistor is integrated in the line, as a result of which in the corresponding participant only the detection of the voltage drop takes place.

15. The method of claim 10, wherein the shunt resistor is integrated in each participant, as a result of which a complete current detection takes place in each corresponding participant.

16. The method of claim 10, wherein the shunt resistor is integrated in a plug connection between the bus line and the corresponding participant, as a result of which for a resistor is not included in the bus line and the corresponding participant.

17. The method of claim 10, wherein the shunt resistor in the corresponding participant is integrated in an semiconductor component in the corresponding participant.

18. The method of claim 17, wherein the shunt resistor integrated in the semiconductor component is defined by internal wiring of the semiconductor component.

19. The method of claim 1, wherein each corresponding participant further includes an inverse-polarity protection diodes are arranged between the controllable switch and the bus connection switch.

20. The method of claim 1, wherein the bus line is routed via a return line to both sides of the central control unit.

21. The method of claim 1, wherein the reference potential for the controllable switch of each corresponding participant is a supply voltage of each corresponding participant.

22. The method of claim 1, wherein the method is applied to a wire of a multi-wire bus system.

* * * * *